United States Patent [19]

Matsukawa et al.

[11] 3,869,406

[45] Mar. 4, 1975

[54] PROCESS FOR PREPARING MICROSCOPIC CAPSULES

[75] Inventors: Hirohara Matsukawa; Keiso Saeki, both of Fujimiya, Japan

[73] Assignee: Fuji Photo Film, Kanagawa, Japan

[22] Filed: May 24, 1972

[21] Appl. No.: 256,493

[30] Foreign Application Priority Data
May 24, 1971 Japan................................ 46-35316

[52] U.S. Cl.............. 252/316, 117/36.2, 117/62.2, 117/100 A, 264/4
[51] Int. Cl......................... B01j 13/02, B44d 1/02
[58] Field of Search ....... 252/316; 117/100 A, 62.2; 264/4

[56] References Cited
UNITED STATES PATENTS
2,969,331 1/1961 Brynko et al. ...................... 252/316
3,069,370 12/1962 Jensen et al. ..................... 252/316 X
3,687,865 8/1972 Katayama et al. .................. 252/316

FOREIGN PATENTS OR APPLICATIONS
2,027,819 12/1970 Germany ............................ 252/316

*Primary Examiner*—Richard D. Lovering
*Attorney, Agent, or Firm*—Sughrue, Rothwell, Mion, Zinn & Macpeak

[57] ABSTRACT

A process for preparing microcapsules by coacervation using a solution containing at least two hydrophilic colloids having opposite electric charges at least one of said colloids being gellable, comprising emulsifying or dispersing a hydrophobic oil or dust in said solution, causing coacervation of said colloids to form a coacervate wall, gelling said coacervate wall, and hardening said coacervate wall, the improvement which comprises on hardening the coacervate wall, at a temperature not higher than the gel point of said gellable colloid, adding an aqueous solution of (1) a high molecular weight electrolyte having an anionic function group and (2) a condensate represented by the following general formula;

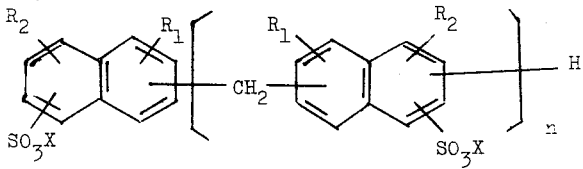

wherein $R_1$ and $R_2$ each represent a hydrogen atom or an alkyl group having from 1 to about 18 carbon atoms so long as at least one of $R_1$ and $R_2$ is an alkyl group, X represents a hydrogen atom or an alkali metal atom and $n$ is a positive integer, is disclosed.

11 Claims, No Drawings

PROCESS FOR PREPARING MICROSCOPIC CAPSULES

BACKGROUND OF THE INVENTION

1. Field of the Invention

This invention relates to a process for preparing microscopic capsules. More particularly, it relates to a process for preparing microscopic capsules containing hydrophobic material thereby using coacervation.

The term "hardening pre-treatment" as used in this specification is intended to cover the procedure of accelerating the reaction between gelatin and aldehydes, i.e., the procedure of bringing the pH of the system to the alkaline side in the presence of aldehydes, or the procedure of adding aldehydes to the system in which the pH has been previously made alkaline. The term "shock" is intended to cover the phenomenon that, when the pre-hardening treatment of the coacervate wall membrane is carried out, the viscosity of the system rapidly increases and coagulation of the system occurs, which results in the production of the aggregating capsules. Furthermore, the term "chock-preventing agent" is intended to cover a compound having the activity of preventing shock.

2. Description of the Prior Art

Many processes for producing microscopic capsules containing a hydrophobic oil are known (e.g., U.S. Pat. No. 2,800,457, Japanese Patent Publication No. 3875/62, etc.).

The process described in the above U.S. Patent comprises the steps of: (1) emulsifying a water-immiscible oil in an aqueous solution of a hydrophilic colloid (a first sol) which is ionizable in water (emulsifying steps), (2) mixing the resulting emulsion (1) with an aqueous solution of a hydrophilic colloid (a second sol) which is ionizable in water and which has an electric charge opposite to that of the first sol colloid, then causing coacervation by diluting with water and adjusting the pH to deposit a complex colloid around each of the oil droplets, whereby an oil containing coacervate is obtained (coacervation step), (3) cooling the resulting coacervate to gel the coacervate wall (gelation step), and (4) bringing the pH to the alkaline side and adding a hardener thereto, or bringing the pH to alkaline side in the presence of a hardener (hardening pre-treatment).

On the other hand, the process described in the above mentioned Japanese Patent Publication No. 3875/62 is a process wherein thickners such as acacia, tragacanth, methyl cellulose, carboxymethyl cellulose, polyglycol, calcium magnesium silicate, etc. are added in step (1) of the process described in the above U.S. Patent so as to deposit the hydrophillic colloid sufficiently. Such thickeners change the surface characteristics of the emulsion to be encapsulated.

However, the oil-containing microscopic capsules prepared according to these processes from multinuclear capsules in clusters and, in addition, it has been impossible to conduct the step of accelerating the hardening of the coacervate wall membrane produced, i.e., the hardening pre-treatment step, in a short period of time. That is, it is necessary to stir for a long period of time (longer than 24 hours) in the presence of a hardener at a temperature such that the capsule wall membrane remains gelled, under acidic conditions or, to add a several percent alkali solution dropwise over a long period of time after greatly diluting the solution. Therefore, the longest period of time in the process for the preparation of microscopic capsules is expended in this step.

If alkali is added without dilution of the capsule solution, the viscosity thereof will begin increasing as the pH increases above 6 and, in the end, the capsules will coagulate resulting in the production of capsules which are irregular in size and which have diameters ranging from several hundred microns to several mm. In addition, the higher the colloid concentration for coacervation is, the greater is the deviation of the optimum pH for coacervation, and the faster the rate of changing pH to alkali, the more violent the coagulation becomes.

Accordingly, it has been required that the gelating concentration for forming coacervation be set so that 1 g of gelatin is contained in more than 50 cc of water.

The inventors have previously improved the above mentioned disadvantages by adding a shock-preventing agent, such as carboxymethyl cellulose, to an oil-containing coacervate to be subjected to the hardening pre-treatment at a temperature lower than the gel point of gelatin (e.g., German OLS No. 1,939,624).

An object of the present invention is to provide a process for preparing microscopic capsules wherein the shock-preventing action is further accelerated.

A second object of this invention is to provide a process for preparing microscopic capsules, wherein the amount of a shock-preventing agent used is further reduced.

A third object of the invention is to provide a process for preparing stable microscopic capsules, wherein deviations in the process caused by a variations in the lots of the starting materials are reduced.

A fourth object of the invention is to provide a process for preparing microscopic capsules, wherein the procedure of bringing the pH of the system to alkaline side in the hardening pre-treatment is conducted in a short time unaccompanied by an increase in viscosity.

A fifth object of the invention lies in a Process for preparing capsules at a high gelatin concentration.

SUMMARY OF THE INVENTION

The inventors have found, as the result of various investigations, the use of a naphthalenesulfonic acid-formalin condensate represented by the following general formula:

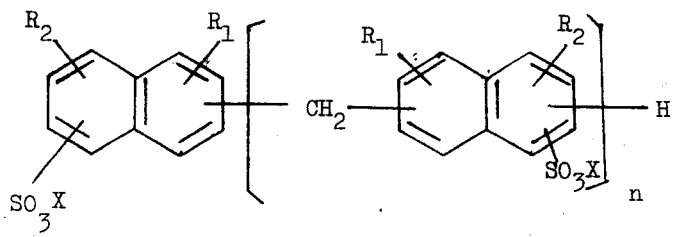

wherein $R_1$ and $R_2$ represent a hydrogen atom or an alkyl group having from 1 to about 18, preferably up to about 4 carbon atoms, X represents a cation such as a hydrogen atom, ammonium group, or an alkali metal atom, such as Na and K, and $n$ represents a positive integer, in combination with a shock-preventing agent can achieve the above described objects.

DETAILED DESCRIPTION OF THE INVENTION

The condensates represented by the above described general formula are well known compounds, which can be synthesized readily and are commercially available. Especially, preferred condensates are those wherein $n$ ranges from 1 to 9. A combination of two or more condensates wherein $n$ is different from each other may also be used.

The process of the present invention comprises generally the following steps:

1. A step of dispersing a hydrophobic fine powder or emulsifying a hydrophobic oil, in an aqueous colloid solution (dispersing or emulsifying step).
2. A step of diluting the dispersion or the emulsion and/or adjusting the pH thereof (coacervation step). At this point, an aqueous solution of a high molecular weight electrolyte colloid is added depending upon the situation.
3. A step of cooling the coacervate to gel (cooling step).
4. A step of adding a hardener thereto.
5. A step of adding a shock-preventing agent and a compound of the foregoing general formula.
6. A step of bringing the pH of the system of the alkaline side. (These steps 4 to 6 are the pre-hardening treatment steps).
7. A step of raising the temperature of the system (hardening step).

However, the order of the pre-hardening step (4), (5), (6) may be (5), (4), (6); (4), (5), (6); (6), (5), (4); or (5), (6), (4). That is, an arbitrary order of (4), (5) and (6) is effective, in as much as a hardener and an alkali are not present at the same time in the system.

All of the steps above described are essentially the same as those which are publicly known, except for the addition of a shock-preventing agent and a compound of the foregoing general formula, and hence it can be said that the invention comprises adding a shock-preventing agent and a compound of the general formula in the pre-hardening treatment step.

As for the shock-preventing agents, suitable ones are the substances described in U.S. Pat. No. 3,687,865 filed Aug. 4, 1967, and are compounds such as cellulose derivatives having an anionic functional group (e.g., carboxymethyl cellulose, carboxyethyl cellulose and metal salts thereof, and cellulose sulfate, cellulose phosphate and metal salts thereof), anionic polysaccaride (e.g., pectic acid), polyvinylbenzenesulfonic acid copolymer (e.g., vinylbenzene sulfonate-acryloyl morpholine copolymer, vinylbenzene sulfonate-morpholinomethyl acrylamide copolymer, vinylbenzene sulfonate-acrylamide copolymer, vinylbenzene sulfonate-vinylpyrrolidone copolymer, vinylbenzene sulfonate-methoxymethylacrylamide), polyacrylic acid copolymer (e.g., acrylic acid-acryloylmorpholine copolymer, acrylic acid-morpholinomethyl acrylamide copolymer, acrylic acid-acrylamide copolymer, acrylic acid-vinylpyrrolidone copolymer, acrylic acid-methoxymethylacrylamide), anionic starch derivatives (e.g., carboxymethyl starch, carboxyethyl starch, starch sulfate, starch phosphate, starch xanthate) and the like.

In general, the amount of the shock-preventing agent added varies according to the coacervation conditions (especially the colloid concentration and the pH thereof), and the amount of the shock-preventing agent based on dried gelatin increases as the colloid concentration increases or as the pH deviates from the opticolloid concentration), and coagulation occurs when the shock-preventing agent is added in an amount less than this. However, when the gelatin concentration is reduced to 1.9% (3.8% in total colloid concentration), the amount of the shock-preventing agent necessary is greater than one-tenth based on the weight of the dried gelatin. At even lower gelatin concentrations, the ratio of the amount of the shock-preventing agent necessary based on gelatin is reduced.

The amount of high molecular weight electrolyte is at least 1/20, preferably 1/15 based on the amount of gellable material.

The amount of naphthalenesulfonic acid-formalin condensate to be used in combination with the shock-preventing agent depends upon the kind and amount of the shock-preventing agent employed, but, in general, amount less than one-fifth based on the amount of gellable material is preferred.

For example, when a 2% aqueous solution of the sodium salt of carboxymethyl cellulose (hereinafter referred to as "CMC") (15CP in viscosity at 25°C and 0.70 in degree of etherification) is used as a shock-preventing agent, the amount of the naphthalenesulfonic acid-formalin condensate ranges from 1/40 to 1/5 based on the gelatin amount when the amount of CMC is 1/10 based on the gelatin amount, and ranges from 1/100 to 1/10 when the amount of CMC is 1/5 based on the gelatin.

It is necessary for the coacervation colloid to contain at least two hydrophilic colloids which are oppositely charged, at least one of the colloids being gellable (such as gelatin, gelatin derivative (e.g., gelatin phthalate, gelatin succinate) such as referred to U.S. Pats. Nos. 2,525,753, 2,614,928, 2,614,930).

As examples of said colloid having an opposite charge to said gellable colloid, there are gum-arabic, styrene-maleic acid copolymer, polyethylene-maleic acid copolymer, methylvinyl ether-maleic acid copolymer, vinylacetate-maleic acid copolymer, polyacrylic acid, and polycarylic acid copolymer.

Suitable hydrophilic colloids are, for example, gelatin, casein, alginate, gum arabic, carrageenan, styrene-maleic anhydride copolymer, etc.

Suitable materials used as the nuclei of each capsule, are natural mineral oils, animal oils, vegetable oils, synthetic oils, hydrophobic fine dusts, etc. In order to emulsify and disperse the oily liquid which is to be the nuclear substance, it is desirable to use an anionic or cationic surface active agent, which prevents the formation of a water-in oil emulsion.

The emulsion is diluted and/or the pH thereof is adjusted to deposit a coacervate around the emulsified droplets as a wall membrane.

At this point, in order to prepare mono-nuclear capsules, the coacervation conditions should be made insufficient for completeness. To accomplish this procedures such as (a) reducing the amount of water used in dilution, (b) shifting the pH from the value at which maximum coacervate yield is obtained, (c) changing the ratio of the colloids and/or (d) adding an organic or an inorganic metal salt thereto, etc. should be carried out. Of these procedures, usually, procedure (1) or (2) is enough to prepare mono-nuclear capsules. In addition, the size of the capsules produced can be changed stepwise, by setting up the coacervation conditions intermediate between the optimum condition mum pH value. For example, in the gelatin-gum arabic system, when the ratio of gelatin to gum arabic is adjusted to and the pH of the system adjusted to 4.3, the shock-preventing agent is required in an amount of greater than one-eight based on the weight of the dried gelatin at a gelatin concentration of 2.4% (4.8% in total and the condtions discribed above for preparing mononuclear capsules.

The coacervate deposited on the surface of the oil droplets after the coacervation step is cooled from outside the vessel to cause solidification, whereby the wall membrane is gelled. The addition of, for example, formaldehyde is conducted in order to harden the wall membrane. The pH of the system is then adjusted to the alkaline side. In thie pre-hardening treatment, under the insufficient coacervation conditions wherein mononuclear capsules are produced, the capsules will coagulate unless a shock-preventing agent is present. In the solution, made alkaline the hardening of the capsule wall proceeds by heating.

The addition of a shock-preventing agent and naphthalenesulfonic acid-formalin condensate is carried out at a temperature lower than the gel point of the gelatin used in forming the coacervated wall membrane.

These substances may be added as an aqueous solution simultaneously or independently.

According to the invention, mono-nuclear capsules can be obtained rapidly and in a stable way using gelatin as at least one of the coacervation colloids. In addition, the amount of the shock-preventing agent used can be reduced by about 50% by the addition of a compound represented by the foregoing general formula.

The invention has extended the applicable fields of micro-capsules.

When micro-capsules prepared by the invention are applied to a pressure sensitive copying paper to prepare a capsule-coated paper, work stains formed when superposed on the surface of a clayed paper can be reduced in comparison with the use of conventional multi-nuclear capsules, and, in addition, the definition of the letters, when copied using many sheets of paper at the same time, can be improved.

In the air-knife coating, the coating facility of the liquid is improved and rapid coating is made possible due to the ability to classify the small capsules using air-pressure.

The invention will be further more specifically explained in the following examples, but the invention is not to be interpreted as limited only to them. In the following examples, all parts are by weight.

In the examples, the heat resistance of the capsules was determined by subjecting a capsule-coated paper to a heat resistance test in a hot air drying box and, in addition, by observing whether or not the surface of a clayed paper developed color when the capsule-coated surface is superposed thereon, the capsule-coated paper being prepared by dissolving 2% (based on the oil) of basic dye in oil droplets and coating the resulting capsules on a base paper.

The clayed paper was prepared as follows.

100 parts of activated clay was dispersed in 300 parts of water containing 5 parts of a 40% aqueous solution of sodium hydroxide. Thereafter, 40 parts of Dow Latex 636 (trade name for a styrene-butadiene latex produced by the Dow Chemical Co.) was added thereto and coated on a base paper of 50 g/m$^2$ in weight so that the solid components were coated at a thickness of 12 g/m$^2$. The clayed paper thus prepared was used.

Napthalensulfonic acid-formalin condensate employed in this examples was synthesized as follows.

SYNTHESIS EXAMPLE 1
(Sodium salt of alpha-naphthalenesulfonic acid-formalin condensate)

57 g (0.25 mol calculated as pure) of alpha-naphthalenesulfonic acid, 7.5 g (0.08 mol) of 95% sulfuric acid and 12 g of water were charged in a three neck flask equipped with a stirrer. After dissolving most of the alpha-naphthalenesulfonic acid at 80 – 85°C, 4.3 g of 35.8% purified formalin was added thereto and, further 4.3 g of formalin was added three times at one hour intervals keeping the temperature at 80 – 85°C, and thus 17.2 g (0.21 mol) of formalin was added in total.

After the addition of the formalin, the temperature was raised to 95 – 100°C over a 20 minute period, and the reaction was carried out for 7.5 hours. Thereafter, liming was conducted by adding calcium carbonate diluted with water, and sodium carbonate was added to the hot filtrate to convert it to the sodium salt. Dialysis was carried out to remove as much as possible free ions such as $Ca^{2+}$, $Na^+$, $SO_4^{2-}$, etc. by placing the solution in a cellophane bag. Insoluble precipitates were filtered off and the filtrate was evaporated to dryness to give the end product.

SYNTHESIS EXAMPLE 2
(Sodium salt of beta-naphthalenesulfonic acid-formalin condensate)

The procedure described in Synthesis Example 1 was conducted using beta-naphthalenesulfonic acid instead of alpha-naphthalenesulfonic acid.

SYNTHESIS Example 3
(Sodium salt of methylnaphthalenesulfonic acid-formalin condensate)

The procedure described in Synthesis Example 1 was carried out using methylnaphthalenesulfonic acid obtained by isolating and purifying and finally sulfonating methylnaphthalene prepared by methylating naphthalene, instead of alpha-naphthalenesulfonic acid.

SYNTHESIS EXAMPLE 4
(Sodium salt of propylnaphthalenesulfonic acid-formalin condensate)

50 g of isopropylalcohol and 43.3 g of naphthalene were mixed, and 91 g of 98% sulfuric acid and 120 g of fuming sulfuric acid were added thereto maintaining the temperature at 25°C.

After the addition of all of the acids, the resulting mixture was stirred for 30 minutes, then heated to 45 – 55°C, and reacted for 2 hours at this temperature. Near the end of the reaction, the mixture separated into two layers. After stirring additionally for 4 hours, the lower acid layer was removed, and the upper layer of sulfuric acid was diluted, neutralized, bleached, and filtered off. Suitable amount of Glauber's acid was added thereto to normalize, and the resulting solution was dried using a drier to obtain propylaphthalenesulfonic acid.

The procedure described in Synthesis Example 1 was conducted using propylnaphthalenesulfonic acid thus obtained instead of alpha-naphthalenesulfonic acid.

SYNTHESIS EXAMPLE 5
(Sodium salt of butylnaphthalenesulfonic acid-formalin condensate)

The procedure described in Synthesis Example 4 was conducted using anhydrous butanol instead of isopropylalcohol to prepare butylnaphthalenesulfonic acid, which was then used to obtain the end product in the same manner as described in the Synthesis Example 1.

The above described condensates are known to those skilled in the art.

EXAMPLE 1

6 parts of acid-processed gelatin having an isoelectric point at 8.2 and 6 parts of gum arabic were dissolved in 30 parts of water warmed to 35°C. In this solution was emulsified 25 parts of chlorinated diphenyl containing 2.0% of Crystal Violet Lactone (hereinafter referred to as "C.V.L") with vigorous stirring to produce an oil-in-water emulsion, and the stirring was discontinued when the oil droplets became 10-15 microns in size. Thus, emulsification was completed. Thereafter, the resulting emulsion was poured into 190 parts of water warmed to 35°C and stirred for 5 minutes. The pH thereof was then adjusted to 4.4 by adding dropwise 50% acetic acid while continuing the stirring. The vessel was cooled externally to solidify the colloid deposited around the oil droplets while continuing the stirring. When the temperature of the solution decreased to 8°c, 3.0 parts of 37% formalin solution was added thereto while continuing the stirring. Thereafter, 30 parts of a 5% aqueous solution of the sodium salt of carboxymethyl cellulose (hereinafter referred to as "CMC solution") (0.75 in degree of etherification, 16 cp in viscosity* in a 2% aqueous solution at 25°C) and 2 parts of a 10% aqueous solution of the sodium salt of beta-naphthalenesulfonic acid-formalin condensate prepared in Synthesis Example 2 were added thereto. After separating for 3 minutes, a 10% sodium hydroxide aqueous solution was added dropwise in order to bring the pH to the alkaline side while continuing the stirring, and thus, the pH was adjusted to 10.5 in 5 minutes. Then, the temperature of the solution was raised to 40°C over a 20 minute period to obtain capsules with a high heat resistance, encapsulating chlorinated biphenyl containing C.V.L.

*The viscosity can be a measure of the degree of polymerization.

In order to demonstrate that the encapsulation process according to the invention is stable from a process standpoint, the behavior of the viscosity during the change of the pH and the size of the resulting capsules in the system wherein CMC and the sodium salt of beta-naphthalenesulfonic acid-formalin condensate which were added in Example 1 are not added (Comparison Example 1) and in the system wherein CMC alone is added (Comparison Example 2), are given in the following table.

When a capsule-coated paper prepared by coating the micro-capsules obtained in this example in such a way that the chlorinated biphenyl was coated on 40 g/m² base paper in a thickness of 4 g/m², was superposed on a clayed paper and typewritten, there was obtained a blue distinct color image.

In addition, after the heat test in an air-drying box (100°C) for 10 hours, the above described capsule-coated paper was superposed on a clayed paper and typewritten. However, the density of the color image was not reduced at all in comparison with the density prior to the heat test. Therefore, the resulting capsules were shown to be excellent in heat resistance.

Comparison of the Behavior of Viscosity and the Size of the Resulting Capsules

| | Example 1 | Comparison Example 1 | Comparison Example 2 |
|---|---|---|---|
| Viscosity at 10°C | 75 CP*¹ | 75 CP | 75 CP |
| Viscosity after the addition of shock-preventing agent | Note 1 34 CP | Note 2 68 CP | Note 3 52 CP |
| Viscosity at pH 6.0 | 38 CP | 345 CP | 64 CP |
| Viscosity at pH 8.0 | 42 CP | Several thousand CP (aggregates) | 164 CP |
| Viscosity at pH 10.0 | 37 CP | | 60 CP |
| Size of the resulting capsules | 10–20 microns | 50 microns-several thousand microns | 10–20 microns |

Note
1: In the system to which CMC and beta-naphthalenesulfonic acid-formalin condensate were added.
Note
2: Water was added in the same amount as was used for dissolving the CMC in Example 1.
Note
3: Only CMC solution was added.
*¹ CP(centipoise) is a unit of viscosity measured using a B-type rotation viscometer (made by Tokyo Keiki Seizosho Co., Ltd.).

As is obvious from the results of the comparison test, an increase viscosity during the change in the pH is understood to be small in Example 1 in comparison with those in Comparison Examples 1 and 2.

EXAMPLE 2

6 parts of acid-processed gelatin having an isoelectric point at 8.5 were dissolved in 30 parts of water warmed to 35°C. In this solution was emulsified 30 parts of isopropyldiphenyl containing 2.0% of 3,3-bis(p-dimethylaminophenyl)phthalide (popularly referred to as Malachite Green Lactone) with vigorous stirring to prepare an oil-in-water emulsion. Stirring was discontinued when the oil droplets became 15–20 microns in size. Thereafter, the resulting emulsion was poured into an aqueous solution prepared by dissolving 4 parts of gum arabic in 160 parts of water warmed to 35°C, and the pH was adjusted to 4.4 by adding dropwise 10% hydrochloric acid with stirring.

The following steps were all conducted with stirring.

Then, the vessel was cooled externally to solidify the colloid deposited around the oil droplets. When the temperature of the solution became 17°c, 2.5 parts of 37% formalin solution were added thereto. Cooling was continued and, when the temperature decreased to 8°C, 20 parts of a 5% aqueous solution of carboxymethylhydroxyethyl cellulose (CMHEC) (0.89 in degree of etherification and 125 CP in viscosity in a 1% aqueous solution at 25°C) and 20 parts of a 10% aqueous solution of the sodium salt of alpha-naphthalenesulfonic acid-formalin condensate obtained in Synthesis Example 1 were added.

After stirring for a two minute period, the pH was adjusted to 9.5 by adding dropwise a 25% sodium hydroxide solution. The addition was finished in 3 minutes. The temperature was then increased to 40°C to harden the wall membrane.

When a capsule-coated paper prepared by coating the resulting capsules on a base paper of 40 g/m² in weight at the thickness of 6.5 g/m² based on the weight of the solid ingredients, was superposed on a clayed paper and written on with a pencil, a light-blue distinct color image was obtained. No deterioration in color density was observed even after the capsule-coated paper was left in a drying box for 10 hours at 100°c.

In order to compare the stability of the viscosity behavior in the process, the viscosity behavior in the system wherein CMHEC and the sodium salt of alpha-naphthalenesulfonic acid-formalin condensate which were added in this example, were not added are given in the following table as Comparison Examples 3 and 4.

|  | Example 2 | Comparison Example (Nothing was added) | Comparison Example 4 (CMHEC system) |
|---|---|---|---|
| Viscosity at 10°C | 36 CP | 36 CP | 36 CP |
| Viscosity after the addition of shock-preventing agent | 20 CP | *2 32 CP | 30 CP |
| Viscosity at pH 6.0 | 24 CP | 243 CP | 84 CP |
| Viscosity at pH 8.0 | 35 CP | aggre- | 228 CP |
| Viscosity at Ph 10.0 | 27 CP | gates | 145 CP |

*2 Water only was added in the same amount as was used for dissolving a shock-preventing agent.

EXAMPLE 3

The procedure described in Example 1 was conducted except that 1.2 parts of cellulose sulfate (0.62 in degree of esterification and 24 CP in viscosity in a 2% aqueous solution at 25°C) and 0.4 part of the sodium salt of methylnaphthalenesulfonic acid-formalin condensate prepared in Synthesis Example 3 dissolved in 20 parts of water were used as shock-preventing agents. The viscosity of the system wherein only the cellulose sulfate was used as a shock-preventing agent is given as Comparison Example 5.

|  | Example 3 | Comparison Example 5 |
|---|---|---|
| Viscosity after the addition of shock-preventing agent | 39 CP | 64 CP |
| Viscosity at pH 6.0 | 42 CP | 95 CP |
| Viscosity at pH 8.0 | 58 CP | 195 CP |
| Viscosity at pH 10.0 | 40 CP | 75 CP |

EXAMPLE 4

The procedure described in Example 1 was conducted except that 1 part of carboxymethyl starch (0.72 in degree of etherification and 38 CP in viscosity in a 2% aqueous solution at 20°C) and 0.5 part of the sodium salt of propylnaphthalenesulfonic acid-formalin condensate prepared in Synthesis Example 4 dissolved in 20 parts of water were used as shock-preventing agents.

The viscosity of the system wherein carboxymethyl starch alone was added is given in the following table as Comparison Example 6.

|  | Example 4 | Comparison Example 6 |
|---|---|---|
| Viscosity after the addition of shock-preventing agent | 42 CP | 65 CP |
| Viscosity at pH 6.0 | 54 CP | 84 CP |
| Viscosity at pH 8.0 | 61 CP | 130 CP |
| Viscosity at pH 10.0 | 47 CP | 74 CP |

EXAMPLE 5

The procedure described in Example 2 was conducted except that 25 parts of a 5% potassium vinylbenzenesulfonate-acryloylmorpholine copolymer (63.9 mol percent in potassium vinylbenzenesulfonate content in the copolymer and 0.740 in intrinsic viscosity in a 1N NaNO$_3$ solution (1 g/100 ml) at 30°C) and 15 parts of a 2% aqueous solution of the sodium salt of butylnaphthalenesulfonic acid-formalin condensate prepared in Synthesis Example 5 was used instead of the CMHEC as the shock-preventing agent.

The viscosity of the system wherein potassium vinylbenzene-sulfonateacrylolymorpholine copolymer alone was used as a shock-preventing agent is given in the following table as Comparison Example 7.

|  | Example 5 | Comparison Example 7 |
|---|---|---|
| Viscosity after the addition of shock-preventing agent | 35 CP | 54 CP |
| Viscosity at pH 6.0 | 38 CP | 74 CP |
| Viscosity at pH 8.0 | 45 CP | 146 CP |
| Viscosity at pH 10.0 | 39 CP | 59 CP |

EXAMPLE 6

6 parts of acid-processed gelatin having an isoelectric point at 7.8, 3 parts of gum arabic and 2 parts of carrageenan were dissolved in 30 parts of water warmed to 35°C. In this solution was emulsified 30 parts of lemon oil with vigorous stirring to obtain an oil-in-water emulsion containing oil droplets of 20–30 microns in size. Thereafter, the resulting emulsion was poured into 180 parts of water warmed to 30°C and the pH was adjusted to 4.0 by a adding dropwise 50% citric acid while continuing the stirring. The vessel was cooled externally while continuing the stirring to solidify the colloid deposited around the oil droplets. When the temperature of the solution decreased to 15°C, 12 parts of a 10% pectin aqueous solution was added thereto. Cooling was continued and, at a temperature of 12°c, 2 parts of a 37% formalin aqueous solution was added and, at 8°C, 4 parts of a 15% aqueous solution of DEMOL N(trade name for the sodium salt of naphthalenesulfonic acid-formalin condensate sold by the Kao Atlas Co., Ltd. ) was added thereto.

After stirring for a 2 minute period, the pH was adjusted to 9.0 by adding dropwise a 10% sodium hydroxide aqueous solution over a 5 minute period. Thereafter, the temperature was raised to 40°C to harden the wall membrane. In this way, there was obtained lemon oil-containing micro-capsules, with more than 95% thereof being mononulcear.

The viscosity during the dropwise addition of the alkali was compared with that in the system, given as Comparison Example 8 wherein DEMOL N was not added.

|  | Example 6 | Comparison Example 8 |
|---|---|---|
| Viscosity after the addition of shock-preventing agent | 69 CP | 85 CP |
| Viscosity at pH 6.0 | 71 CP | 98 CP |
| Viscosity at pH 8.0 | 85 CP | 170 CP |
| Viscosity at pH 10.0 | 63 CP | 89 CP |

EXAMPLE 7

6 parts of acid-processed gelatin having an isoelectric point at 7.8 and 4 parts of gum arabic were dissolved in 25 parts of water warmed to 35°C. In this solution was emulsified 30 parts of di-isopropylnaphthalene containing 6.0% of 3-N,N-diethylamino-7-(N,N-dibenzylamino with vigorous stirring to prepare an oil-in-water emulsion. Stirring was discontinued when the oil droplets became 15-20 microns in size. Then, 165 parts of water warmed to 30°C were poured into the resulting emulsion and, with stirring, 20% tartaric acid was added thereto to adjust the pH to 4.2.

The following steps were all conducted with stirring.

Then, the vessel was cooled externally to solidfy the colloid deposited around the oil droplets. When the temperature of the solution decreased to 8°C, 0.8 part of carboxymethyl starch (0.60 in degree of etherification and 25 CP in viscosity in a 2% aqueous solution at 25°C) and 0.7 part of DEMOL MS (trade name for the sodium salt of methylnaphthalenesulfonic acid-formalin condensate sold by the Kao Atlas Co., Ltd.) dissolved in 20 parts of water were added thereto. After stirring for a 5 minute period, 10% sodium hydroxide was added to adjust the pH to 9.0. Furthermore, 2 parts of 25% glutaraldehyde were added dropwise and, successively, 10% sodium hydroxide was added thereto to adjust the temporarily lowered pH to 10.0. Thereafter, the temperature was raised to 40°C to harden the wall membrane.

When the capsule-coated paper prepared by coating the resulting capsules on a base paper of 40 g/m² in weight at a thickness of 6.0 g/m² based on the weight of the solid ingredients, was superposed on a clayed paper and written on with a pencil, a distinct green color image was obtained. The heat-resistance of the capsules was also good. No deterioration in color density was observed in a heat test at 100°C for 10 hours.

The viscosity during the process was compared with that in the system given as Comparison Example 9 wherein carboxymethyl starch alone was used.

|  | Example 7 | Comparison Example 9 |
|---|---|---|
| Viscosity at 8°C | 32 CP | 32 CP |
| Viscosity after the addition of shock-preventing agent | 18 CP | 25 CP |
| Viscosity at pH 9.0 | 16 CP | 22 CP |
| Viscosity after the addition of glutaraldehyde | 48 CP | 96 CP |

While the invention has been described in detail and in terms of various embodiments thereof, it will be apparent to one skilled in the art that changes and modifications can be made therein without departing from the spirit and scope thereof.

What is claimed is:

1. In a process for preparing microcapsules by coacervation using a solution containing at least two hydrophillic colloids having opposite electric charges, at least one of said colloids being gellable, comprising emulsifying or dispersing a hydrophobic oil or dust in said solution, causing coacervation of said colloids to form a coacervate wall, gelling said coacervate wall, and hardening said coacervate wall, the improvement comprising on hardening the coacervate wall, at a temperature not higher than the gel point of said gellable colloid, adding an aqueous solution of (1) a high molecular weight electrolyte having an anionic functional group in a shock-preventing amount which is sufficient to prevent a rapid increase in viscosity and coagulation of the system, and (2) a condensate represented by the following general formula in an amount sufficient to accelerate the shock-preventing action of the high molecular weight electrolyte (1), which condensate is different from the high molecular weight electrolyte (1);

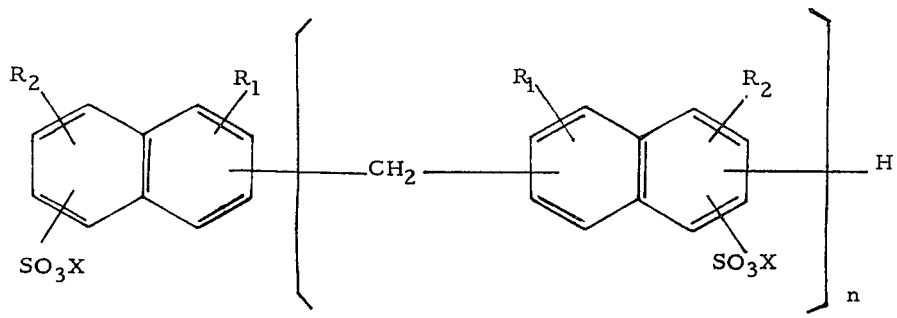

wherein $R_1$ and $R_2$ can each represent a hydrogen atom or an alkyl group having from 1 to about 18 carbon atoms, so long as at least one of $R_1$ and $R_2$ is an alkyl group, X represents a hydrogen atom or an alkali metal atom and $n$ is a positive integer, wherein said anionic high molecular weight electrolyte is selected from the group consisting of an anionic cellulose derivative selected from the group consisting of carboxymethyl cellulose, carboxyethyl cellulose and the metal salts thereof, and cellulose sulfate, cellulose phosphate and metal salts thereof, an anionic polysaccharide selected from the group consisting of pectin and pectin acid, a polyvinylbenzenesulfonic acid copolymer selected from the group consisting of vinylbenzenesulfonate-acryloylmorpholine copolymer, vinylbenzenesulfonate-morpholinomethyl acrylamide copolymer, vinylbenzenesulfonate-vinylpyrrolidone copolymer and vinylbenzenesulfonate-methoxymethylacrylamide, a polyacrylic acid copolymer selected from the group consisting of acrylic acid-acryloylmorpholine copolymer, acrylic acid-morpholinomethyl acrylaminde copolymer, acrylic acid-acrylamide copolymer, acrylic acid-vinylpyrrolidone copolymer and acrylic acid-methoxymethylacrylamide copolymer, and an anionic starch derivative selected from the group consisting of carboxymethyl starch, carboxyethyl starch, starch sulfate, starch phosphate and starch xanthate.

2. The process of claim 1, wherein $n$ ranges from 1 to 9.

3. The process of claim 1, wherein said gellable colloid is gelatin or a gelatin derivative.

4. The process of claim 1, wherein said gellable colloid is gelatin.

5. The process of claim 1, wherein said colloid having an opposite charge to said gellable colloid is selected from the group consisting of gum-arabic, styrene-maleic acid copolymer polyethylene-maleic acid copolymer, methylvinylether-maleic acid copolymer, vinylacetate-maleic acid copolymer, polyacrylic acid and polyacrylic acid copolymer.

6. The process of claim 1, wherein said condensate is present by weight at a level of less than one-fifth the amount by weight of the gellable colloid.

7. The process of claim 1, wherein said condensate is selected from the group consisting of methyl-, propyl- and butyl naphthalene sulfonic acid-formalin condensates.

8. The process of claim 1, wherein $R_1$ and $R_2$ each represent an alkyl group having from 1 to about 18 carbon atoms.

9. The process of claim 1, wherein an oil is emulsified.

10. The process of claim 6, wherein the amount of high molecular weight electrolyte is at least 1/20 of the amount of gellable material.

11. The process of claim 10, wherein the amount of high molecular weight electrolyte is at least 1/15 based on the amount of gellable material.

* * * * *